Jan. 30, 1923. 1,443,659
A. R. STEPHEN.
BELT FEED FOR PICKING TABLES.
FILED APR. 15, 1922.
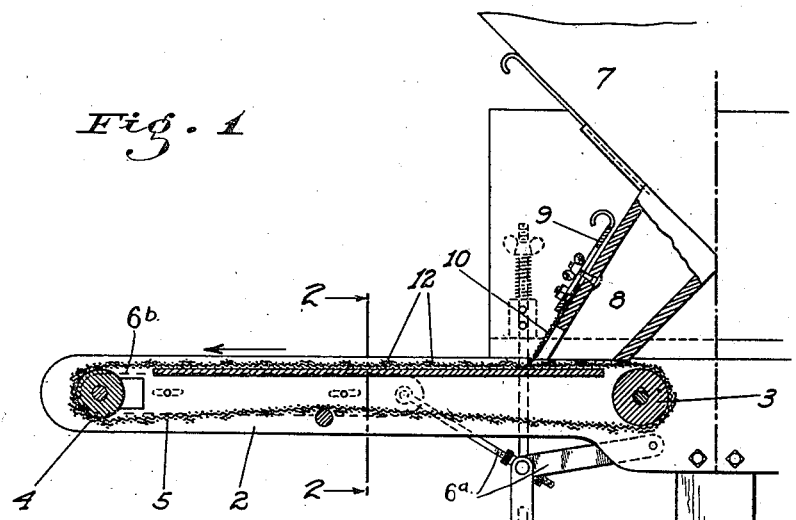
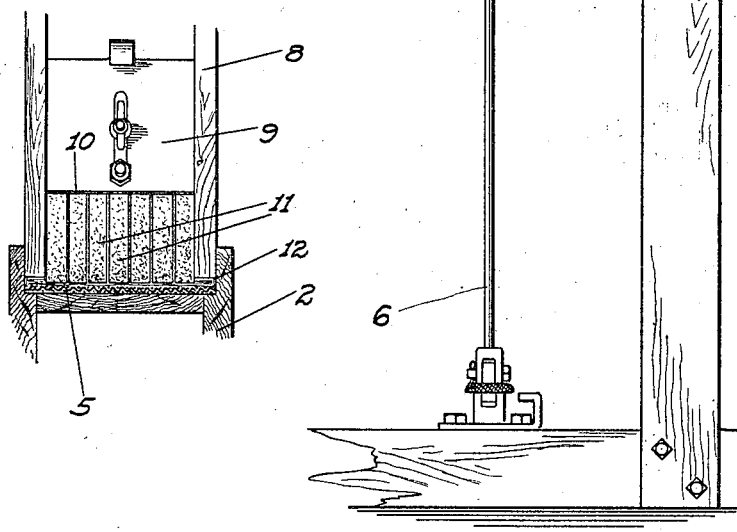
INVENTOR.
Archibald R. Stephen
BY
ATTORNEY Patented Jan. 30, 1923.

1,443,659

UNITED STATES PATENT OFFICE.

ARCHIBALD R. STEPHEN, OF LODI, CALIFORNIA.

BELT FEED FOR PICKING TABLES.

Application filed April 15, 1922. Serial No. 553,260.

*To all whom it may concern:*

Be it known that I, ARCHIBALD R. STEPHEN, a citizen of the United States of America, residing at Lodi, county of San Joaquin, State of California, have invented certain new and useful Improvements in Belt Feeds for Picking Tables; and I do declare the following to be a full, clear, and exact description of the same, reference being had to the accompanying drawings, and to the characters of reference marked thereon, which form a part of this application.

This invention relates to improvements in hand picking or sorting tables such as are used in the picking and sorting of nuts, beans and similar produce, and is a divisional part of my application for patent on "belt control for picking tables" Serial No. 523,702, filed December 20th, 1921, and allowed March 18th, 1922.

This invention is particularly an improvement in regard to the form of belt and feed means shown in my Patent No. 1,414,598, on "hand picking tables."

With the construction embodied in the patent referred to, considerable improvement in the feeding of the produce onto the table was obtained, over previous devices, but at the same time some difficulty was experienced in getting a thin and even distribution of the produce on the picking-table belt, as said produce comes from the hopper, owing to the natural tendency of the same to pack behind the control gate of the hopper-chute and then of course to discharge all at once in over-large and irregular quantities.

The principal object of the present invention is to eliminate the above-named feeding trouble by preventing any packing of the produce behind the control gate, and thus insuring a steady and even flow of the produce onto the belt.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a longitudinal section through a picking table and the hopper from which the produce is discharged onto the belt.

Fig. 2 is a cross section taken on the line 2—2 of Fig. 1.

Referring now more particularly to the characters of reference on the drawings, the numeral 1 denotes a standard supported from the floor, fixed to and projecting horizontally from which are spaced frames 2 between which are rollers 3 and 4, over which passes an endless belt 5, which forms the table or picking surface. The roller 3 is journalled in the frames and driven by any suitable means, while the roller 4 is movable longitudinally to alter the tension of the belt, such movement being controlled by a vertical pedal-operated rod 6, to the upper end of which are connected pairs of toggle arms $6^a$, one of each of which is connected to plates $6^b$ slidably mounted on the outside of the frames 2, and in which the rollers 4 are journaled. This mechanism is fully covered in application Serial No. 523702, identified above.

A hopper 7 in which the produce to be sorted or picked over is kept is mounted over the table, and has a discharge chute 8 leading to the belt a short distance from the roller 3, and terminating adjacent the upper surface of the belt, which moves away from said roller, or toward the roller 4.

The front of the chute is in the form of a vertically adjustable gate 9, which in turn has an individually adjustable flexible flap member 10 projecting therebelow, and which comprises a plurality of flexible fingers 11 mounted as a single unit, this flexible flap construction being the same as shown in the above mentioned patent on "hand picking table."

The belt is provided on its upper surface at intervals with transverse cleats 12, preferably made of a layer or two of the fabric belt-goods; and consequently very shallow as to depth, and also somewhat flexible.

In operation, as the belt moves under the chute and away from the latter and its gate, a thin layer of nuts and the like is drawn from inside the chute to the outside thereof, passing between the belt and the flexible flap, the latter giving somewhat to allow the produce to emerge.

As previously stated however there is a tendency for the produce to pack behind the gate-flap, which a smooth-surfaced belt will not prevent, and which continues until the volume accumulated is sufficient to press past the flap, resulting in an undesired depth of produce on the belt in places, and none at all at other points.

The action of the belt-cleats however is to strike and break away the pack before it has really assumed the proportions of such. In other words, the constant movement of the cleats past the chute prevents the formation of a pack, and insures an even and steady flow of the produce onto the belt.

At the same time, the depth and size of these cleats is not sufficient to interfere with the operations of the picker at the table, while the flexibility of the cleats prevents interference with the ready and automatic taking-up of the belt on one side or other, as set forth in said application Serial No. 523,702.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination, a movable belt forming a picking surface, a hopper chute positioned to discharge onto the belt and terminating closely thereagainst, means for allowing a thin layer of produce from the chute to pass onto the belt beyond the chute, and means on the belt adapted to engage said first named means for preventing any packing of the produce in the exit of the chute onto the belt.

2. In combination, a movable belt forming a picking surface, a hopper chute positioned to discharge onto the belt and terminating closely thereagainst, a flexible flap-structure forming the front of the chute and which the produce must disturb to pass out from the chute, and transverse cleats on the outer surface of the belt at spaced intervals arranged to aid only in the disturbing of the flaps.

3. In combination, a movable belt forming a picking surface, a hopper chute positioned to discharge onto the belt and terminating closely thereagainst, a flexible flap-structure forming the front of the chute and which the produce must disturb to pass out from the chute, and shallow transverse cleats on the outer surface of the belt, said cleats being made of flexible material.

In testimony whereof I affix my signature.

ARCHIBALD R. STEPHEN.